Patented Mar. 10, 1942

2,276,231

UNITED STATES PATENT OFFICE 2,276,231

ALKYLOL CYANAMIDE-POLYCARBOXYLIC ACID CONDENSATION PRODUCT

Walter P. Ericks, Cos Cob, Conn., assignor to American Cyanamid Company, New York, N. Y., a corporation of Maine No Drawing. Application October 8, 1940, Serial No. 360,293

13 Claims. (Cl. 260—78)

This invention relates to condensation products of monoalkylol cyanamides and their polymers with organic polycarboxylic acids and their anhydrides and to their methods of preparation. I have found that a new class of condensation products is obtained when monoalkylol cyanamides or their polymers, such as monoethylol cyanamide or diethylol dicyandiamide, are reacted with organic aliphatic or aromatic polycarboxylic acids or their anhydrides.

My new condensation products have an exceedingly complex chemical structure and appear in the form of transparent, viscous, resinous syrups; as sticky, semi-solid resins; as clear or opaque brittle resins; or even as soft or brittle wax-like materials, depending upon the reactants employed in the process. They may, if desired, be further reacted with substances such as formaldehyde to form modified resins of value in the finishing of cotton textiles, etc. My new condensation products are also of value in the formulation of coating compositions, synthetic waxes, floor polishes, as plasticizers for cellulose acetate, phenol-formaldehyde, urea-formaldehyde and melamine resins, as adhesives, in the preparation of synthetic fibers and laminated materials, and for many other uses which will be evident from their chemical and physical characteristics.

Monoalkylol cyanamides for use in the condensation reaction of my invention may be prepared according to known methods, as for example by treating an aqueous solution of sodium cyanamide with ethylene chlorhydrin at low temperatures followed by neutralization with hydrochloric acid, evaporation, and extraction with an organic solvent. I have also found that the same class of materials is obtained when calcium cyanamide, or other suitable and preferably water-soluble cyanamide compound, is reacted with one or more molecules of an alkylene oxide such as ethylene oxide, propylene oxide, the methyl, ethyl or propyl ether of ethylene glycol, glycidol, 5,6 anhydro-monoacetone glucose, glucosan, or other compounds containing an alkylene oxide ring or those which provide such a ring structure during the course of the reaction. When equimolecular ratios of the cyanamide and an alkylene oxide are reacted a simple alcohol derivative is obtained, but when two or more moles of the alkylene oxide or its hydroxy derivatives are reacted with each mole of the cyanamide there are obtained ether alcohol derivatives including the hydroxy-alkoxalkylol compounds obtained when sugar anhydrides or an excess of glycidol is used. I have designated this latter class as alkoxyalkylol cyanamides.

I have developed an excellent method for the manufacture of monoalkylol cyanamides which may be illustrated in connection with the preparation of monoethylol cyanamide. This process is based on the use of alkali-earth cyanamides, such as calcium cyanamide, together with ethylene oxide, which is relatively cheap and easily available in large quantities. The calcium cyanamide is introduced slowly and with vigorous agitation into water at a temperature not exceeding 30° C., and the mixture is cooled during 30 minutes to 5° C. with continued stirring. An equimolecular amount of ethylene oxide is then introduced slowly into the agitated suspension at a temperature preferably not exceeding 10° C., care being taken that no large excess of ethylene oxide is present at any time.

After all the ethylene oxide has been added the mixture is stirred for 1 hour at a temperature of 1–10° C., the agitation stopped, the temperature brought up to about 25–30° C. within a few hours and the mixture filtered at this temperature and the filter cake washed with water. $CO_2$ is passed into the combined filtrate to precipitate the calcium as carbonate which is filtered off, and the filtrate is evaporated at low temperatures until a thick, oily syrup is obtained. As the product polymerizes readily high evaporation temperatures should be avoided and it is preferable to carry out the evaporation under reduced pressures of 10–20 mm. of mercury.

Monoethoxyethylol cyanamide may be obtained by using 2 moles of ethylene oxide for each mole of cyanamide in the above process. Monoisopropyl cyanamide is prepared by reacting calcium cyanamide and propylene oxide as described above. Pentahydroxypropoxy-dihydroxy-propyl cyanamide is prepared by the reaction of 6 moles of glycidol

with one mole of calcium cyanamide.

The exact chemical structure of these compounds may vary with varying conditions of the reaction but I believe that a representative formula is

in which R is either an alkyl or alkoxyalkyl radical, depending on whether one or several moles of alkylene oxide were reacted with each mole of cyanamide. Monoethylol cyanamide, one of the simplest monoalkylol cyanamides, undergoes intramolecular rearrangement, however, and may exist in at least four tautomeric forms. Accordingly I wish it to be understood that I am not limited to any particular structural formula such as I have used above for illustrative purposes. The alkylol cyanamides are all extremely reactive and polymerize readily upon heating to the dimer, trimer and possibly higher polymers having structures too complex to be described with certainty.

When an alkylol cyanamide or its polymer is reacted with an organic polycarboxylic acid or its anhydride, a condensation takes place which produces waxy or resinous materials having valuable properties. Preferably the reactants are heated to temperatures between 100 and 250° C. whereupon the condensation takes place. It is not always necessary, however, to apply heat to the reactants to cause a condensation to take place. For example, in condensing maleic anhydride with monoethylol cyanamide, it is found that the reaction is of an exothermic character.

The alkylol cyanamides which I have reacted with organic polycarboxylic acids and their anhydrides include monoethylol cyanamide, isopropyl cyanamide, isobutylol cyanamide, isobutoxybutylol cyanamide, pentahydroxypropoxydihydroxypropyl cyanamide and the like.

I have carried out the condensation using a large number of polycarboxylic acids, either aliphatic or aromatic, saturated or unsaturated, containing the di- and tricarboxylic groups, the acid anhydrides and even mixtures of these materials. Such acids as succinic, adipic, sebacic, and citric, and the anhydrides of phthalic and maleic acid have been used with good results in the condensation reaction with monoalkylol cyanamides. I believe, therefore, that the condensation is perfectly general in character and will operate with any alkylol cyanamide and any organic polycarboxylic acid to produce condensation products of the same general type having a wax-like or resinous character.

By varying the molecular ratio of the alkylol cyanamide to the polycarboxylic acid I have found it possible to control the nature of the condensation product. For example, when 1 mole of monoethylol cyanamide was condensed with 1 mole of phthalic anhydride the product was a hard, non-sticky transparent resin. When 2 moles of monoethylol cyanamide were condensed with 1 mole of phthalic anhydride the resulting product was a pliable, sticky transparent resin. It has also been found possible, and even desirable in some instances, to carry out the condensation in the presence of an inert solvent or diluent such as, for example, xylenon. The formation of lighter colored resins may also be favored by exclusion of air from the reaction zone. This may be accomplished by establishing an atmosphere of an inert gas, as $CO_2$, nitrogen, or mixtures thereof in the reaction vessel.

The waxy and resinous condensation products of my invention are like other resinous materials generally in that their chemical structure is highly complex. I have accordingly not been able to assign structures to them or to classify them with particularity. Nevertheless, the condensation reaction proceeds readily to form characteristic waxy and resinous products having definite physical and chemical properties which will be described in connection with the various specific examples which follow.

The invention will now be illustrated in greater detail by means of the following specific examples. It should be understood, however, that these examples are given primarily for purposes of illustration and although certain specific details are recited my invention in its broader aspects is not limited thereto.

*Example 1*

361 parts by weight of monoethylol cyanamide (90%) and 432 parts of succinic acid, in the molecular ratio of approximately 1:1, were heated slowly with stirring. At a temperature of about 150° C. a white, wax-like intermediate product was formed. Upon further heating to 200° C. a sticky, transparent, viscous, pale-yellow liquid was obtained which upon cooling gave a viscous resin.

*Example 2*

361 parts of monoethylol cyanamide (90%) and 584 parts of adipic acid, in the molecular ratio of approximately 1:1, were heated slowly with stirring to 160° C. A clear, pale-yellow liquid was formed which on cooling gave a white, wax-like material. Upon heating to 260° C. and cooling the material was a transparent, viscous liquid which on standing became translucent.

*Example 3*

202 parts monoethylol cyanamide (85%) and 404 parts sebacic acid, in the molecular ratio of approximately 1:1, were heated with stirring for one hour at 125° C. and subsequently at 150° C. for one half hour. Upon cooling the product was a cream-colored, soft wax-like material sparingly soluble in toluene and water and readily soluble in alcohol.

A small proportion of the product was heated to 260° C. but no evidence of further reaction was observed.

*Example 4*

66.9 parts isopropylol cyanamide (74.6% solids) and 101.1 parts sebacic acid and 200 parts of xylenol were charged into a flask equipped with mechanical agitator, condenser, water collector and thermometer and heated. When the xylenol had melted, stirring was started. After 40 minutes heating and at a temperature of 100° C. $CO_2$ was passed through the homogenous liquid. After 80 minutes heating and at a temperature of 213° C. water commenced to collect in the water collector. In 120 minutes, 12.5 parts of water had collected and the operation was discontinued. The reaction mixture was divided into two approximately equal portions.

The first portion was subjected to distillations under reduced pressure of 12–18 mm. and at a temperature of 109–170° until all the xylenol had distilled off. The residue, which was the reaction product, solidified at approximately 70° C. and at room temperature resembled beeswax in appearance. It was insoluble in water but was soluble in alcohol and benzol.

The second half of the reaction product containing xylenol was placed in a flask equipped with an agitator and reflux condenser and heated for 10 hours at approximately 200° C. The xylenol was then distilled off under reduced pressure. With the exception of a darker color the product was identical in appearance and solubility with the product obtained from the first half of the reaction mixture. The use of an inert solvent and of $CO_2$ was found to lead to the formation of products of lighter color.

Example 5

Isobutylol cyanamide and sebacic acid in the molecular ratio of 1:1 were heated with agitation for 30 minutes at 180° C. The reaction product was a soft cream-colored, wax-like material, insoluble in cold water but dissolving in boiling water to give a solution having a pH of approximately 7.0. The material was also soluble in alcohol but sparingly soluble in toluol.

Example 6

Isobutoxy-isobutylol cyanamide (90%) and sebacic acid in the molecular ratio of 1:1 were heated with stirring to 160° C. and this temperature maintained for one hour. Upon cooling the product was a soft cream-colored, wax-like material insoluble in cold water, sparingly soluble in toluene and fairly soluble in ethyl alcohol.

When a smaller proportion of isobutoxy isobutylol cyanamide was used the product became harder. Thus, when 76 parts of isobutoxy-isobutylol cyanamide were reacted with 202 parts of sebacic acid at 180° C. for one half hour the product on cooling to room temperature was a hard brittle wax.

Example 7

287 parts monoethylol cyanamide (90%) and 385 parts citric acid in the molecular ratio of 3 moles monoethylol cyanamide to 2 moles citric acid, were heated with stirring at 120° C. for 20 minutes. Upon cooling a colorless semi-solid sticky resin was formed which was sparingly soluble in cold water and fairly soluble in hot water and hot alcohol.

Example 8

380 parts monoethylol cyanamide and 592 parts phthalic anhydride were heated slowly with stirring to 140° C. The product was a hard, transparent, non-sticky resin which was insoluble in cold water and sparingly soluble in boiling water or boiling toluene. It was readily soluble in ethyl alcohol. Upon further heating to 190° C. and then cooling an opaque brittle resin was obtained which was insoluble in hot water and in common organic solvents.

Example 9

380 parts monoethylol cyanamide and 296 parts phthalic anhydride in the approximate molecular ratios of 2 moles of monoethylol cyanamide to 1 mole phthalic anhydride, were heated slowly with stirring to 130° C. The resulting product was a sticky, transparent, pale-yellow resin. Upon further heating to 230° C. the product became amber-colored but remained a sticky transparent resin.

Example 10

38 parts monoethylol cyanamide, 59 parts phthalic anhydride and 31 parts of monoethylol cyanamide-succinic acid condensation product prepared as in the first part of Example 1 were slowly heated to 160° C. The product was a solid, flexible, transparent resin.

Example 11

38 parts monoethylol cyanamide and 19.6 parts maleic anhydride in the molecular ratio of approximately 4 moles of monoethylol cyanamide for 1 mole of maleic anhydride were stirred together without heating. An exothermic reaction was found to take place and the temperature rose to 80° C. When the reaction had subsided and cooled the product was found to be an amber-colored sticky resin which dissolved in water to give a solution alkaline to litmus.

Example 12

1 mole of pentahydroxypropoxy-dihydroxypropyl cyanamide (90%) and 2 moles succinic acid were heated with stirring to about 160° C. and reacted at this temperature for one half hour. Upon cooling the product was an amber-colored, transparent, sticky resin soluble in hot water and alcohol and insoluble in toluene.

What I claim is:

1. A composition of matter comprising the condensation product of a member of the group consisting of polycarboxylic acids and their anhydrides with a member of the group consisting of alkylol cyanamides and their polymers.

2. A composition of matter comprising the condensation product of a member of the group consisting of polycarboxylic acids and their anhydrides with monoethylol cyanamide.

3. A composition of matter comprising the condensation product of a dicarboxylic acid with a member of the group consisting of alkylol cyanamides and their polymers.

4. A composition of matter comprising the condensation product of an aromatic dicarboxylic acid with a member of the group consisting of alkylol cyanamides and their polymers.

5. A composition of matter comprising the condensation product of an aliphatic dicarboxylic acid with a member of the group consisting of alkylol cyanamides and their polymers.

6. A composition of matter comprising the condensation product of an aliphatic dicarboxylic acid with monoethylol cyanamide.

7. A composition of matter comprising the condensation product of succinic acid with monoethylol cyanamide.

8. A composition of matter comprising the condensation product of phthalic anhydride with monoethylol cyanamide.

9. A composition of matter comprising the condensation product of sebacic acid with monoethylol cyanamide.

10. A method of producing waxy and resinous materials which comprises reacting a member of the group consisting of polycarboxylic acids and their anhydrides with a member of the group consisting of alkylol cyanamides and their polymers.

11. A method of producing waxy and resinous materials which comprises reacting a member of the group consisting of polycarboxylic acids and their anhydrides with monoethylol cyanamide.

12. A method of producing wax-like materials which comprises reacting monethylol cyanamide with sebacic acid.

13. A method of producing resin-like materials which comprises reacting monethylol cyanamide with phthalic anhydride.

WALTER P. ERICKS.